United States Patent
Kim et al.

(10) Patent No.: US 12,431,489 B2
(45) Date of Patent: Sep. 30, 2025

(54) SULFUR-CARBON COMPOSITE, METHOD FOR PREPARING THE SAME, AND POSITIVE ELECTRODE FOR LITHIUM-SULFUR BATTERY AND LITHIUM-SULFUR BATTERY COMPRISING THE SAME

(71) Applicant: LG CHEM, LTD., Seoul (KR)

(72) Inventors: Soohyun Kim, Daejeon (KR); Kwonnam Sohn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1056 days.

(21) Appl. No.: 17/052,295

(22) PCT Filed: Jun. 4, 2019

(86) PCT No.: PCT/KR2019/006704
§ 371 (c)(1),
(2) Date: Nov. 2, 2020

(87) PCT Pub. No.: WO2020/009332
PCT Pub. Date: Jan. 9, 2020

(65) Prior Publication Data
US 2021/0234159 A1    Jul. 29, 2021

(30) Foreign Application Priority Data

Jul. 3, 2018 (KR) .................. 10-2018-0076882

(51) Int. Cl.
*H01M 4/36* (2006.01)
*H01M 4/02* (2006.01)
(Continued)

(52) U.S. Cl.
CPC ............. *H01M 4/38* (2013.01); *H01M 4/366* (2013.01); *H01M 4/583* (2013.01); *H01M 4/623* (2013.01);
(Continued)

(58) Field of Classification Search
CPC ........ H01M 4/38; H01M 4/366; H01M 4/583; H01M 4/623; H01M 4/661; H01M 10/36;
(Continued)

(56) References Cited

U.S. PATENT DOCUMENTS

2008/0166633 A1   7/2008   Hwang et al.
2013/0164635 A1   6/2013   Schmidt et al.
(Continued)

FOREIGN PATENT DOCUMENTS

CN   101217193 A   7/2008
CN   103560235 A   2/2014
(Continued)

OTHER PUBLICATIONS

Nan et. al.; Durable Carbon-Coated Li2S Core-Shell Spheres for High Performance Lithium/Sulfur Cells.; JACS, 2014, 136, 4659-4663. (Year: 2014).*

(Continued)

*Primary Examiner* — Christian Roldan
(74) *Attorney, Agent, or Firm* — Birch, Stewart, Kolasch & Birch, LLP

(57) ABSTRACT

A composite including a sulfur-carbon composite and a coating layer on a surface of the sulfur-carbon composite, the coating layer including a porous carbon material and a point contact binder is disclosed. Also disclosed is a method for preparing the same, and a positive electrode for a lithium-sulfur battery and a lithium-sulfur battery including the same.

13 Claims, 5 Drawing Sheets

(51) Int. Cl.
*H01M 4/38* (2006.01)
*H01M 4/583* (2010.01)
*H01M 4/62* (2006.01)
*H01M 4/66* (2006.01)
*H01M 10/36* (2010.01)
*H01M 10/44* (2006.01)

(52) U.S. Cl.
CPC .......... *H01M 4/661* (2013.01); *H01M 10/36* (2013.01); *H01M 10/44* (2013.01); *H01M 2004/021* (2013.01); *H01M 2004/027* (2013.01); *H01M 2004/028* (2013.01)

(58) Field of Classification Search
CPC .......... H01M 10/44; H01M 2004/021; H01M 2004/027; H01M 2004/028; H01M 4/13; H01M 4/36; H01M 4/364; H01M 4/62; H01M 10/052; H01M 4/622; H01M 4/625; Y02E 60/10
USPC .......................................... 429/231
See application file for complete search history.

(56) References Cited

U.S. PATENT DOCUMENTS

| | | | |
|---|---|---|---|
| 2014/0342234 A1* | 11/2014 | Guo | B82Y 30/00 427/113 |
| 2015/0188129 A1* | 7/2015 | Park | H01M 4/622 252/511 |
| 2015/0340688 A1 | 11/2015 | Rhee et al. | |
| 2015/0340696 A1 | 11/2015 | Son et al. | |
| 2016/0248087 A1 | 8/2016 | Kim et al. | |
| 2017/0170452 A1 | 6/2017 | Uchida et al. | |
| 2017/0214051 A1 | 7/2017 | Yoon et al. | |
| 2018/0351166 A1 | 12/2018 | Chen | |
| 2019/0067682 A1 | 2/2019 | Cho et al. | |
| 2019/0245203 A1 | 8/2019 | Cho et al. | |

FOREIGN PATENT DOCUMENTS

| | | | |
|---|---|---|---|
| CN | 104064738 A | | 9/2014 |
| CN | 104752695 A | | 7/2015 |
| CN | 105900268 A | | 8/2016 |
| CN | 109314228 A | | 2/2019 |
| JP | 2013-527579 A | | 6/2013 |
| JP | 2015-128051 A | | 7/2015 |
| JP | 2015-531987 A | | 11/2015 |
| JP | 2016-18762 A | | 2/2016 |
| JP | 2016-535716 A | | 11/2016 |
| JP | 2018-535915 A | | 12/2018 |
| JP | 2019-509613 A | | 4/2019 |
| KR | 10-2014-0090109 A | | 7/2014 |
| KR | 10-2015-0015644 A | | 2/2015 |
| KR | 10-2015-0077043 A | | 7/2015 |
| KR | 10-2015-0135961 A | | 12/2015 |
| KR | 20160037084 | * | 4/2016 |
| KR | 10-2017-0089333 A | | 8/2017 |
| KR | 10-2018-0048309 A | | 5/2018 |
| WO | WO 2017/079976 A1 | | 5/2017 |
| WO | WO 2018/030686 A1 | | 2/2018 |

OTHER PUBLICATIONS

Extended European Search Report for European Application No. 19830665.6, dated Jun. 24, 2021.

International Search Report issued in PCT/KR2019/006704 (PCT/ISA/210), dated Sep. 6, 2019.

* cited by examiner

[Figure 1]
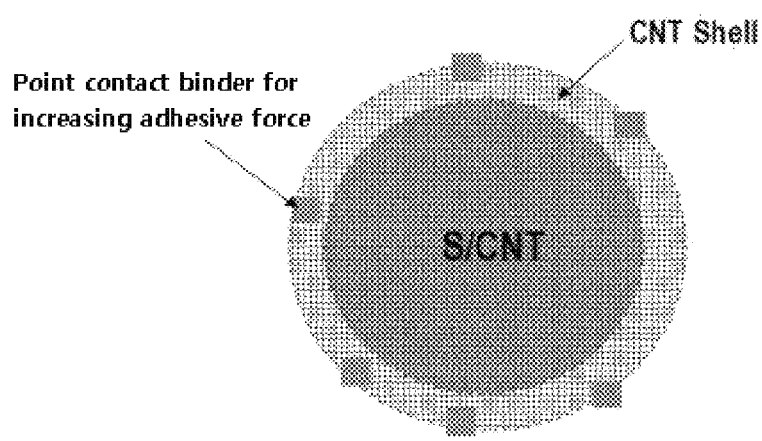
[Figure 2]
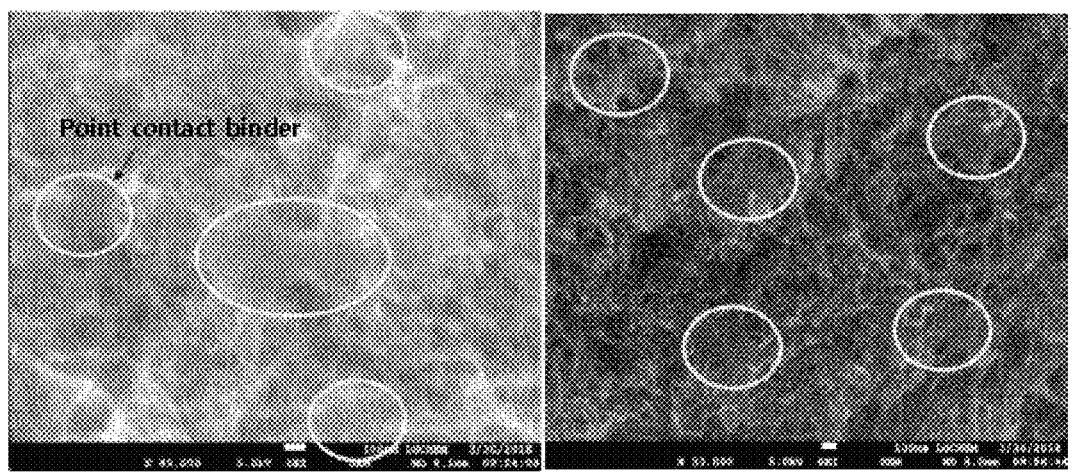

[Figure 3]
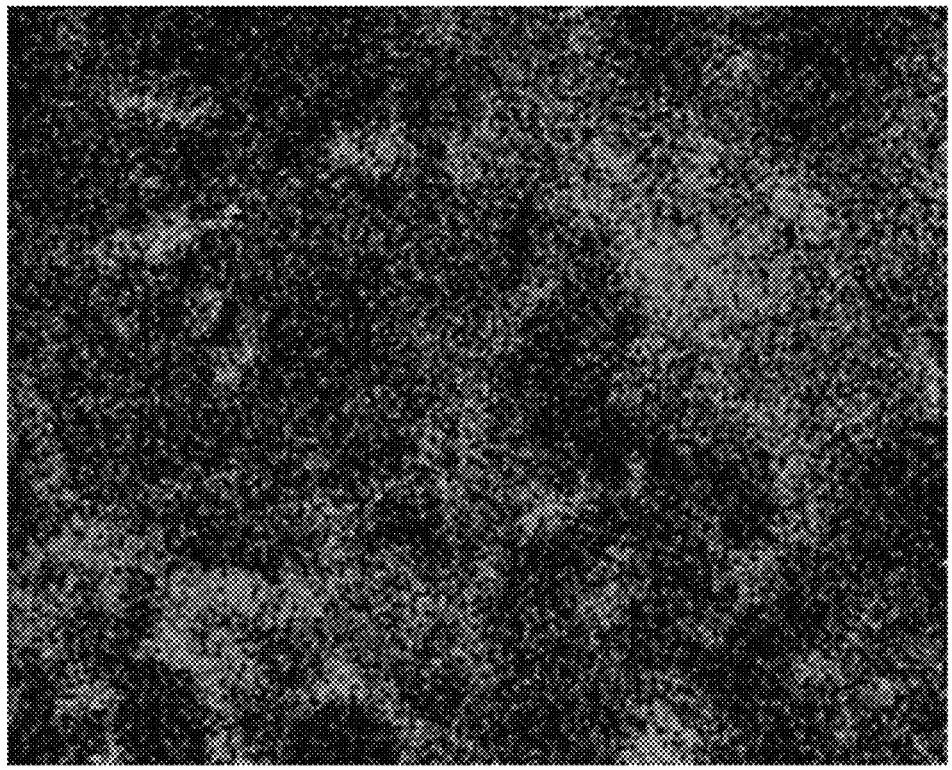
[Figure 4]
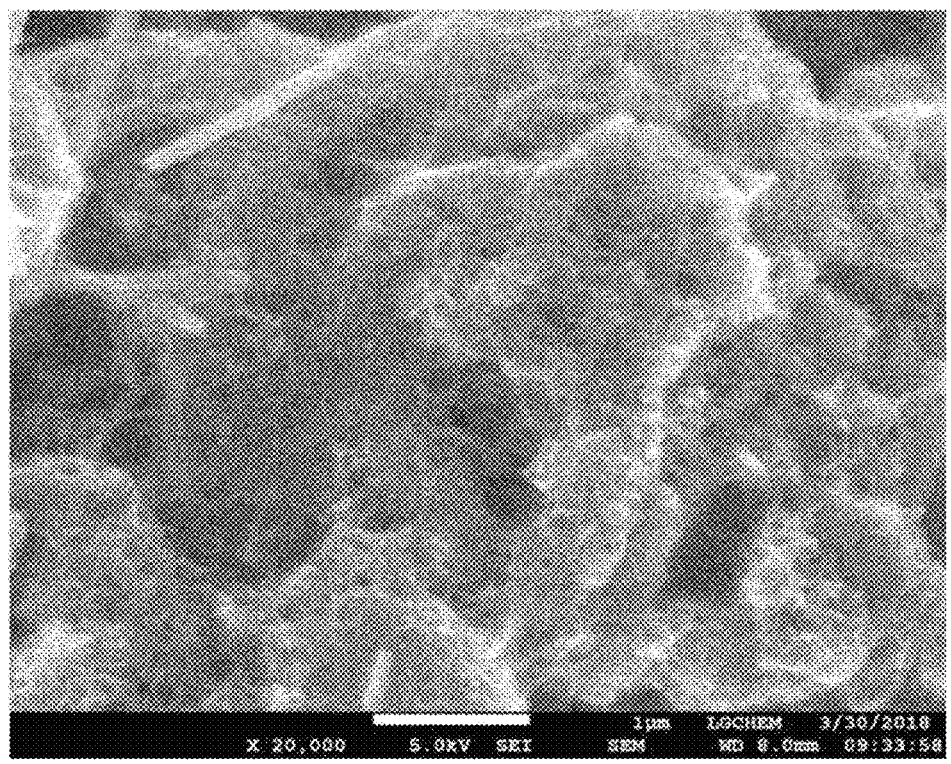

[Figure 5]
Example 2
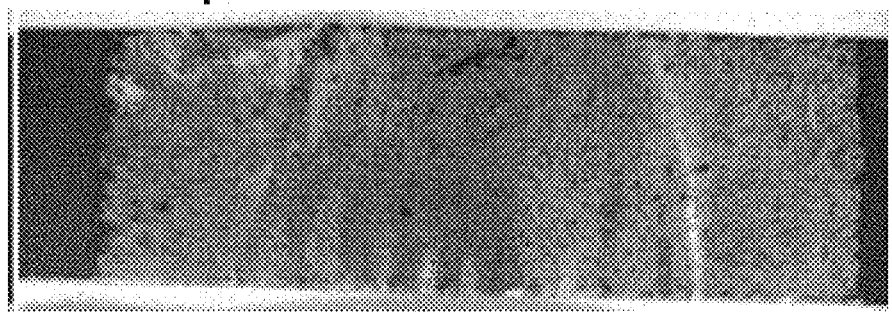
[Figure 6]
Comparative Example 1
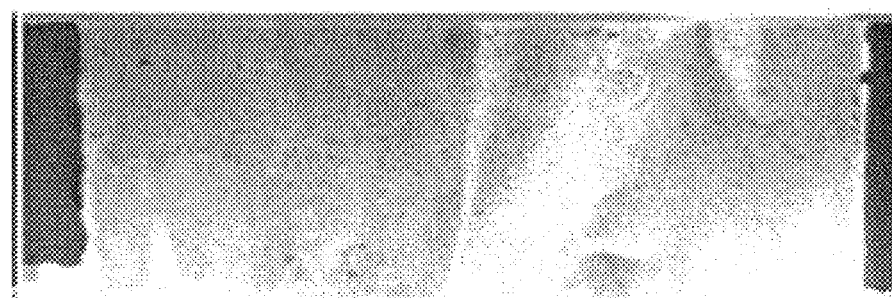

[Figure 7]
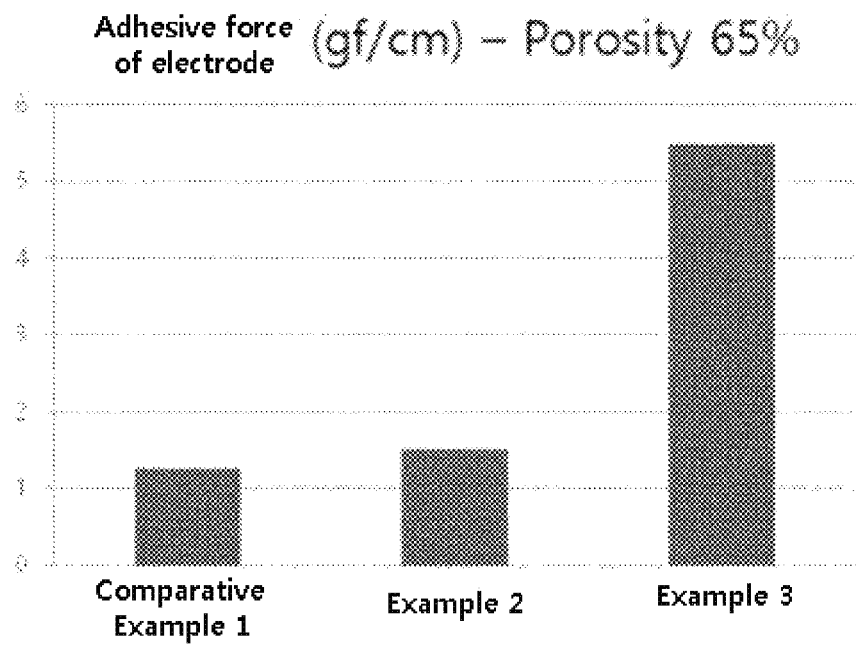
[Figure 8]
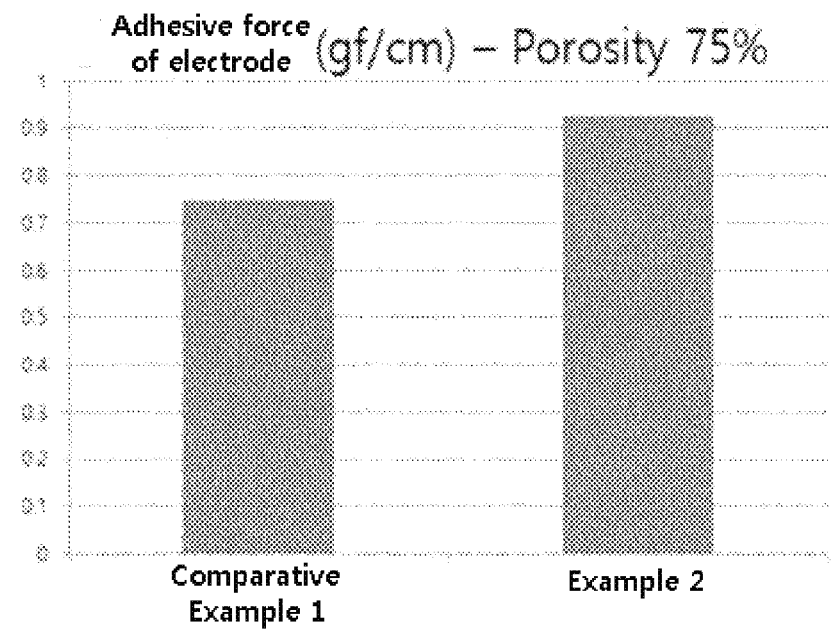

[Figure 9]
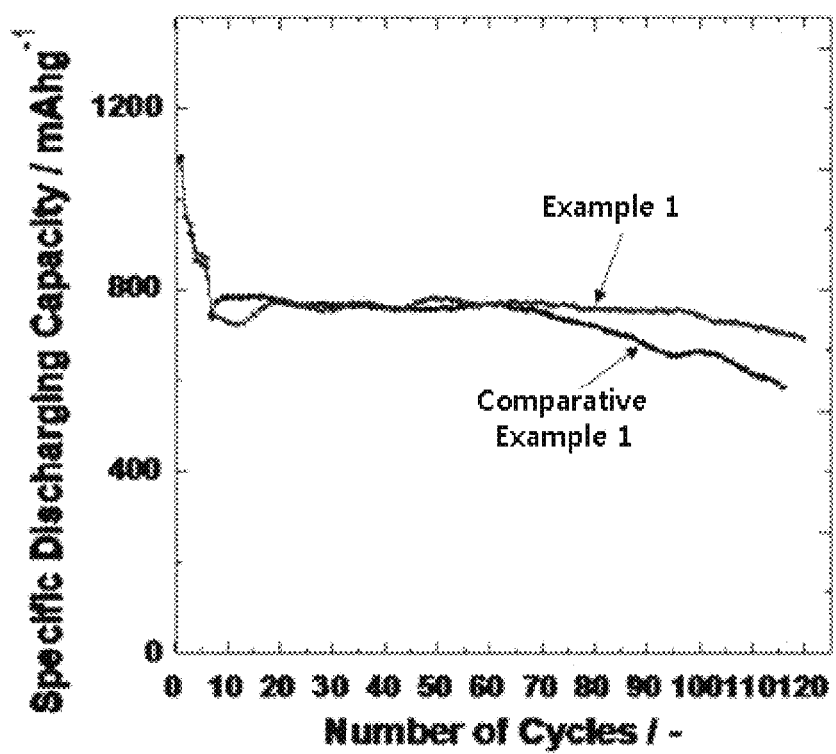

SULFUR-CARBON COMPOSITE, METHOD FOR PREPARING THE SAME, AND POSITIVE ELECTRODE FOR LITHIUM-SULFUR BATTERY AND LITHIUM-SULFUR BATTERY COMPRISING THE SAME

TECHNICAL FIELD

The present application claims priority to and benefits of Korean Patent Application No. 10-2018-0076882 filed on Jul. 3, 2018, the entire disclosure of which are incorporated herein by reference its entirety.

The present invention relates to a sulfur-carbon composite, and a positive electrode for a lithium-sulfur battery and a lithium-sulfur battery comprising the same.

BACKGROUND ART

Recently, as the miniaturization, the weight lightening, and the high performance of electronic devices and communication devices are rapidly progressing and the need for electric vehicles has been greatly increased in relation to environmental problems, there is also a growing demand for performance and lifetime improvements in the secondary battery used as energy sources for these products. A lithium-sulfur battery using sulfur-based compound as positive electrode active material is attracting attention as a secondary battery that satisfies this demand.

The lithium-sulfur battery is a secondary battery that uses a sulfur-based compound comprising a sulfur-sulfur bond as a positive electrode active material and uses a carbon-based material of which is capable intercalating/deintercalating lithium metal or lithium ion, or silicon or tin etc. which forms an alloy with lithium, as a negative electrode active material.

During the discharging of the lithium-sulfur battery, at the positive electrode, sulfur accepts the electrons and thus the reduction reaction proceeds, and at the negative electrode, oxidation reaction occurs while lithium is ionized. Specifically, sulfur before discharging has an annular Ss, and during the reduction reaction (discharging), as the sulfur-sulfur bond is cut off, the oxidation number of sulfur decreases, and during the oxidation reaction (charging), as the sulfur-sulfur bond is re-formed, electrical energy is stored and generated using an oxidation-reduction reaction in which the oxidation number of sulfur increases.

In particular, the theoretical discharging capacity of the lithium-sulfur battery is 1,675 mAh/g, and its theoretical energy density is 2,600 Wh/kg. Since the theoretical energy density of the lithium-sulfur battery is about 5 times higher than that of the lithium ion battery (about 570 Wh/kg) currently under study, the lithium-sulfur battery is a battery capable of realizing high capacity, high energy density and long life. In addition, since sulfur, which is a main material of the positive electrode active material, has a low atomic weight, is rich in resources, is easy to supply, is cheap, is non-toxic, and is an environmentally friendly substance, the lithium-sulfur battery can be used as a source of energy for medium to large-sized devices such as electric vehicles as well as portable electronic devices and thus are being studied extensively.

Since sulfur used as a positive electrode active material in a lithium-sulfur battery has an electric conductivity of $5 \times 10^{-30}$ S/cm, which is a nonconductor having no electrical conductivity, and thus there is a problem that it is difficult to transfer electrons generated by an electrochemical reaction. Therefore, sulfur is composited into a sulfur-carbon composite in combination with a conductive material such as carbon capable of providing an electrochemical reaction site and then used.

Meanwhile, during the actual operation of the lithium-sulfur battery, as the cycles progress, since the initial capacity and the cycle lifetime are rapidly decreased and thus sufficient performance cannot be secured, lithium-sulfur battery has not yet been commercialized. This is due to the fact that sulfur which is a positive electrode active material expands in its volume due to the reduction reaction, or lithium polysulfides which are intermediate products during the reduction reaction are leached into the electrolyte solution, so that sulfur is lost and no longer participates in the charging/discharging reaction of the battery. Therefore, various techniques for improving the stability and electrochemical reactivity of the sulfur-carbon composite have been proposed.

For example, a carbon layer was introduced on the surface of a sulfur-carbon composite to improve the electrochemical reactivity of the sulfur-carbon composite. However, the specific surface area is increased due to the carbon layer, and the adhesive force of the electrode is lowered, so that it is difficult to manufacture the electrode, and problems such as detachment have occurred. Therefore, in order to improve the adhesive force of the electrode, although the electrode was manufactured while changing the type and ratio of the binder, problems such as a decrease in battery performance and a decrease in energy density occurred Therefore, it is necessary to develop a sulfur-carbon composite that has excellent adhesive force to electrodes and does not deteriorate the performance of the battery.

PRIOR ART DOCUMENT

Patent Document

Korean Patent Publication No. 10-2015-0015644.

DISCLOSURE

Technical Problem

In order to achieve the above objects, the present invention provides a composite comprising a sulfur-carbon composite, which comprises a first porous carbon material and sulfur contained in at least a part of an inside and a surface of the first porous carbon material, and a coating layer on the surface of the sulfur-carbon composite, which comprises a second porous carbon material and a point contact binder.

In addition, the present invention provides a method for preparing a sulfur-carbon composite comprising a coating layer, which comprises the steps of:
 (a) preparing a sulfur-carbon composite by mixing a first porous carbon material and sulfur;
 (b) dispersing a second porous carbon material and a point contact binder in a dispersion medium to prepare a dispersion; and
 (c) injecting and wet-mixing the sulfur-carbon composite into the dispersion and then forming a coating layer comprising the second porous carbon material and the point contact binder on a surface of the sulfur-carbon composite comprising the coating layer.

In addition, it is another object of the present invention to provide a lithium-sulfur battery which comprises the positive electrode for the lithium-sulfur battery.

Technical Solution

In order to achieve the above objects, the present invention provides a sulfur-carbon composite comprising a coating layer, wherein the sulfur-carbon composite comprises a porous carbon material and sulfur contained in at least a part of the inside and the surface of the porous carbon material, and the coating layer is located on the surface of the sulfur-carbon composite and comprises a porous carbon material and a point contact binder.

In addition, the present invention provides a method for preparing a sulfur-carbon composite comprising a coating layer, which comprises the steps of:
(a) preparing a sulfur-carbon composite by mixing a porous carbon material and sulfur;
(b) dispersing a porous carbon material and a point contact binder in a dispersion medium to prepare a dispersion; and
(c) injecting and wet-mixing the sulfur-carbon composite into the dispersion and then forming a coating layer comprising the porous carbon material and the point contact binder on the surface of the sulfur-carbon composite.

In addition, the present invention provides a positive electrode for lithium-sulfur battery comprising a positive electrode current collector; and a positive electrode active material layer on the positive electrode current collector, wherein the positive electrode active material layer comprises the sulfur-carbon composite comprising the coating layer of the present invention, a conductive material, and a binder.

In addition, the present invention provides a lithium-sulfur battery comprising a positive electrode; a negative electrode; a separator interposed between the positive electrode and the negative electrode; and an electrolyte solution, wherein the positive electrode is the positive electrode of the present invention.

Advantageous Effects

The sulfur-carbon composite comprising the coating layer of the present invention can prevent the detachment by comprising the point contact binder in the coating layer and thus increasing the adhesive force to the positive electrode current collector.

Also, the lithium-sulfur battery comprising the sulfur-carbon composite has an effect of improving stability and lifetime characteristics of the battery.

DESCRIPTION OF DRAWINGS

FIG. 1 is a schematic diagram of the sulfur-carbon composite comprising the coating layer of the present invention.

FIG. 2 is a SEM photograph of the sulfur-carbon composite comprising the coating layer of Example 2.

FIG. 3 is an EDS photograph of the positive electrode for the lithium-sulfur battery which comprises the sulfur-carbon composite comprising the coating layer of Example 2.

FIG. 4 is a SEM photograph of the positive electrode for the lithium-sulfur battery which comprises the sulfur-carbon composite comprising the coating layer of Example 2.

FIG. 5 is a photograph of the surface of the positive electrode for the lithium-sulfur battery which comprises the sulfur-carbon composite comprising the coating layer of Example 2.

FIG. 6 is a photograph of the surface of the positive electrode for the lithium-sulfur battery which comprises the sulfur-carbon composite of Comparative Example 1.

FIG. 7 is a graph showing the results of the adhesive force of the positive electrode active material layer to the current collector in an electrode having a porosity of 65%.

FIG. 8 is a graph showing the results of the adhesive force of the positive electrode active material layer to the current collector in an electrode having a porosity of 75%.

FIG. 9 is a graph showing lifetime characteristic of the coin cell according to Experimental Example 2 of the present invention.

BEST MODE

Hereinafter, the present invention will be described in more detail.

The "composite" as used herein refers to material that two or more materials are combined to express a more effective function while forming physically and chemically different phases to each other.

The lithium-sulfur battery among various secondary batteries is gaining popularity as a next-generation battery, due to the advantages that the lithium-sulfur battery has high discharge capacity and theoretical energy density, and sulfur, which is used as a positive electrode active material, is abundant in reserves, low cost, and environmentally friendly.

However, in the lithium-sulfur battery, sulfur is converted from the cyclic $S_8$ structure to the linear structure of lithium polysulfides ($Li_2S_x$, x=8, 6, 4, 2) by the reduction reaction and eventually, when the lithium polysulfides are completely reduced, lithium sulfide ($Li_2S$) is finally produced. Among the lithium polysulfides which are intermediate products of the reduction reaction of sulfur, lithium polysulfide with high oxidation number of sulfur ($Li_2S_x$, usually x>4) is a strong polar material that is easily dissolved in an electrolyte solution containing a hydrophilic organic solvent and is leached out of the reaction zone of the positive electrode, so that it is no longer able to participate in the electrochemical reaction. Also, sulfur is changed into lithium sulfide ($Li_2S$) that is a discharging product, resulting in a volume expansion of about 80%, and as a result, there is a problem that the pore volume inside the positive electrode is reduced and contact with the electrolyte solution becomes difficult. In addition, the electrolyte solution is decomposed and consumed due to formation of a passivation layer (Solid Electrolyte Interphase: SEI) or reaction with impurities during the operation of the battery.

Since the amount of sulfur involved in the electrochemical reaction is low, along with this loss of sulfur and electrolytic solution and large change in the volume of the positive electrode, not only the lithium-sulfur battery cannot realize all of the theoretical capacity and the energy density in actual operation in spite of the advantages described above, but also there is a problem that the deterioration of the initial capacity and cycle characteristics is accelerated after a certain cycle.

In order to improve the electrical conductivity of sulfur, a method of forming a composite with or coating a conductive material such as carbon or polymer has been used. Among various methods, since the sulfur-carbon composite is effective in improving the electrical conductivity of the positive electrode, the sulfur-carbon composite is most commonly used as a positive electrode active material. However, it is still insufficient in terms of charging/discharging capacity and efficiency.

In addition, in the case of the lithium-sulfur battery, the lithium polysulfide formed in the positive electrode during the charging/discharging reaction is lost outside the reaction zone of the positive electrode, resulting a shuttle phenomenon moving between the positive electrode and the negative electrode. At this time, as lithium sulfide is fixed on the surface of lithium metal by side reaction between lithium polysulfide leached from the positive electrode and lithium metal which is negative electrode, there is a problem that the reaction activity is lowered and lithium ions are unnecessarily consumed, thereby accelerating the deterioration of the efficiency and lifetime of the battery.

Therefore, conventionally, in order to solve the problem of continuous-lowering the reactivity of the electrode due to the dissolution and shuttle phenomenon of the lithium polysulfide and the problem of the reduction of the discharge capacity, a sulfur-carbon composite formed by forming a coating layer comprising a carbon material capable of adsorbing lithium polysulfide on the sulfur-carbon composite was provided.

However, the conventional sulfur-carbon composite comprising the coating layer comprising the carbon material has a weak adhesive force to the positive electrode current collector and causes detachment phenomenon, so that there is a problem that it is difficult to manufacture a positive electrode.

In order to overcome these problems, a positive electrode for a lithium-sulfur battery was fabricated by changing the ratio and type of the binder in the positive electrode active material comprising the sulfur-carbon composite. However, problems such as deterioration of the performance of the lithium-sulfur battery and lowering of the energy density were occurred, and when using different kinds of binders, an agglomeration phenomenon of the binders was occurred.

Accordingly, the present invention was intended to provide a sulfur-carbon composite which has excellent adhesive ability to positive electrode current collector while improving the performance of the lithium-sulfur battery.

That is, the present invention relates to a sulfur-carbon composite comprising a coating layer, wherein the sulfur-carbon composite comprises a porous carbon material and sulfur contained in at least a part of the inside and the surface of the porous carbon material, and the coating layer is located on the surface of the sulfur-carbon composite and comprises a porous carbon material and a point contact binder.

The sulfur-carbon composite of the present invention is used as a positive electrode active material.

The sulfur-carbon composite of the present invention comprises a coating layer on the surface, and the coating layer contains a porous carbon material and a point contact binder, thereby increasing the adhesive force of the positive electrode active material to the positive electrode current collector and thus preventing the detachment of the positive electrode active material, and it is easy to manufacture the positive electrode for the lithium-sulfur battery.

The porous carbon material of the coating layer may be any one selected from the group consisting of carbon nanotubes, carbon nanofibers, carbon nanoribbons, carbon nanobelts, carbon nanorods, graphene, graphene oxide, reduced graphene oxide, carbon black, activated carbon and mesoporous carbon. At this time, the carbon nanotubes can be single wall carbon nanotubes (SWCNT), double wall carbon nanotubes (DWCNT), multiwall carbon nanotubes (MWCNT), rope carbon nanotubes, or a combination thereof, and the graphene-based carbon material such as graphene, graphene oxide, and reduced graphene oxide may be in a sheet or fiber phase, but is not limited thereto. The porous carbon material according to an embodiment of the present invention may be carbon nanotubes, and the carbon nanotubes may have a diameter of 5 to 50 nm and a length of 500 nm to 10 μm. The average diameter and length of the carbon nanotubes can be measured by methods well known to those skilled in the art. For example, it can be measured from transmission electron microscopy (TEM), high-resolution transmission electron microscope (HR-TEM), scanning electron microscope (SEM), or field-emission scanning electron microscope (FE-SEM) photographs and/or it can be measured using a measuring device using dynamic light scattering.

The porous carbon material in the coating layer can adsorb lithium polysulfides generated in the lithium-sulfur battery and re-use the leached lithium polysulfides to improve the charging/discharging efficiency of the battery. Also, the porous carbon material is located on the surface of the sulfur-carbon composite and has a high specific surface area, thereby improving the electrical conductivity.

The porous carbon material contained in the coating layer is included in an amount of 40 to 80% by weight, preferably 40 to 60% by weight based on the total weight of the coating layer. If the content of the porous carbon material contained in the coating layer is less than 40% by weight, the content of the point contact binder is increased, so that the reactivity of the porous carbon material is lowered, and an overvoltage may occur. In addition, if the porous carbon material is contained in an amount exceeding 80% by weight, the content of the point contact binder is decreased and thus the effect of improving the adhesive force by the point contact binder cannot be occurred.

The sulfur-carbon composite having the coating layer comprising only the conventional porous carbon material according to the prior art was not excellent in the binding ability due to the high specific surface area of the coating layer. Therefore, the detachment may occur due to weak adhesive force to the positive electrode current collector, and there was a problem that the lifetime characteristic of the lithium-sulfur battery is deteriorated.

The present invention was intended to improve the above problem of poor adhesive force by adding a point contact binder to a coating layer.

The point contact binder melts by heat to increase the contact between the sulfur-carbon composites and the contact area between the sulfur-carbon composite and the positive electrode current collector to increase the adhesive force.

As the contact between the sulfur-carbon composites and the contact between the sulfur-carbon composite and the positive electrode current collector in a point pattern, it is possible to improve the adhesive force to the positive electrode current collector without degrading the lifetime characteristic of the lithium-sulfur battery.

If only the area contact binder is used in the coating layer of the sulfur-carbon composite, the adhesive force cannot be sufficiently provided due to the increase of the specific surface area of the electrode, thereby causing a problem of detachment at the electrode.

The point contact binder is a point-type bondable binder and the area contact binder is an area-type bondable binder. The point contact binder and the area contact binder may be the same material, but they can be classified according to the difference in shape.

Specifically, the point contact binder is a round-shaped particle and is sporadically contained in the coating layer of the sulfur-carbon composite, so that the adhesive force between the composite-composite or the composite-current collector can be improved.

Since the area contact binder has a shape that surrounds the entire surface, if the area contact binder is used in the coating layer of the sulfur-carbon composite, a larger amount of area contact binder than the point contact binder is required to coat the surface of the sulfur-carbon composite. In addition, since the area contact binder does not serve to improve the adhesive force, but rather acts as a binder between composite-composite or composite-current collector, the use of the area contact binder cannot be expected to improve the adhesive force. Generally, since a binder is a resistance component and thus when a large amount of a binder is contained, a resistance is generated. Therefore, to improve the adhesive force, it is preferable to use a point contact binder rather than an area contact binder.

The point contact binder may comprise at least one selected from the group consisting of polyvinylpyrrolidone, polytetrafluoroethylene, styrene butadiene rubber, carboxymethyl cellulose, polyvinylidene fluoride, and polyvinylidene fluoride-hexafluoropropylene.

The point contact binder is contained in an amount of 20 to 60% by weight, preferably 40 to 60% by weight based on the total weight of the coating layer.

The above content may be expressed in terms of the total weight of the sulfur-carbon composite. In this case, the point contact binder is contained in an amount of 0.5 to 3% by weight, preferably 0.5 to 1.5% by weight based on the total weight of the sulfur-carbon composite. If the point contact binder is contained in an amount less than 0.5% by weight, it is difficult to improve the adhesive force to the positive electrode current collector. If the point contact binder is more than 3% by weight, there are problems that overvoltage is generated and energy density is decreased.

The thickness of the coating layer may be 50 nm to 100 nm. If the thickness of the coating layer is less than 50 nm, the effect of improving the charging/discharging efficiency and lifetime characteristics of the battery may be insignificant because the effect of adsorbing lithium polysulfide is insignificant. If the thickness of the coating layer exceeds 100 nm, it may cause deterioration of the electrochemical characteristics of the lithium-sulfur battery, thereby deteriorating the efficiency of the battery. Therefore, the thickness of the coating layer is appropriately adjusted in the above range.

In the sulfur-carbon composite according to the present invention, the porous carbon material which is not contained in the coating layer, that is, only contained in the sulfur-carbon composite is any porous carbon material as long as it is commonly used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and activated carbon, and its shape can be used without restriction as long as it is commonly used in the lithium secondary battery in the form of sphere, rod, needle, plate, tube, and bulk.

The sulfur may comprise at least one selected from the group consisting of elemental sulfur ($S_8$), $Li_2S_n$ (n≥1), disulfide compound such as 2,5-dimercapto-1,3,4-thiadiazole and 1,3,5-trithiocyanuic acid, an organic sulfur compound, and a carbon-sulfur polymer (($C_2S_x)_n$: x=2.5 to 50, n≥2). Preferably, inorganic sulfur ($S_8$) can be used.

In the sulfur-carbon composite according to the present invention, the weight ratio of the porous carbon material not contained in the coating layer and sulfur may be 1:9 to 5:5, preferably 2:8 to 3:7. If the weight ratio is less than the above range, the amount of the binder required for preparing the slurry for the positive electrode is increased as the content of the porous carbon material is increased. The increase of the amount of the binder eventually increases the sheet resistance of the electrode, and acts as an insulator to block the electron pass, which may degrade the cell performance. On the contrary, if the weight ratio exceeds the above weight ratio range, since sulfur is agglomerated together and thus it can be difficult for the sulfur to participate directly in the electrode reaction.

Also, in the sulfur-carbon composite comprising the coating layer according to the present invention, the diameter of the sulfur-carbon composite particles inside the coating layer may be between 10 and 50 μm. If the diameter of the sulfur-carbon composite particles is less than 10 μm, there is a problem that the resistance between the particles increases and an overvoltage occurs in the electrode of the lithium-sulfur battery. If the diameter of the sulfur-carbon composite particles exceeds 50 μm, the surface area per unit weight is reduced, so that the wetting area with the electrolyte solution in the electrode and the reaction sites with the lithium ion are decreased, and also the amount of electron transfer relative to the size of the composite is reduced, so that the reaction may be delayed and the discharge capacity of the battery may be reduced. Therefore, the diameter of the sulfur-carbon composite particles is appropriately selected within the above range.

The present invention also relates to a method for preparing a sulfur-carbon composite comprising a coating layer.

The method for preparing the sulfur-carbon composite comprising the coating layer according to the present invention may comprise the steps of:
(a) preparing a sulfur-carbon composite by mixing a first porous carbon material and sulfur;
(b) dispersing a second porous carbon material and a point contact binder in a dispersion medium to prepare a dispersion; and
(c) injecting and wet-mixing the sulfur-carbon composite into the dispersion and then forming a coating layer comprising the second porous carbon material and the point contact binder on the surface of the sulfur-carbon composite.

The step (a) is a step of preparing a sulfur-carbon composite by mixing a porous carbon material and sulfur.

The mixing is for increasing the mixing degree among the above-described materials and can be carried out by using a stirring apparatus which is conventionally used in the art. At this time, the mixing period of time and rate can also be selectively controlled depending on the content and condition of the raw materials.

The heating temperature may be a temperature at which sulfur is melted, specifically, 120 to 180° C., preferably 150 to 180° C. If the heating temperature is lower than 120° C., the sulfur is not sufficiently melted and thus the sulfur-carbon composite structure may not be formed properly. If the heating temperature exceeds 180° C., it is difficult to obtain the desired effect. In addition, the heating period of time can be controlled depending on the content of sulfur.

The step (b) is a step of dispersing a porous carbon material and a point contact binder in a dispersion medium to prepare a dispersion.

The dispersion is for forming a coating layer of a sulfur-carbon composite, and the porous carbon material and the point contact binder are the same as described above.

The dispersion medium is not particularly limited as long as it is a liquid at room temperature and normal pressure, and may be any one selected from the group consisting of water, an alcohol-based compound, a ketone-based compound, and an ether-based compound, or a mixture of two or more thereof.

Specifically, the dispersion medium may be, but is not limited to, water; alcohols such as methanol, ethanol, propanol, isopropanol, butanol, isobutanol, s-butanol, t-butanol, pentanol, isopentanol, and hexanol; ketones such as acetone, methyl ethyl ketone, methyl propyl ketone, ethyl propyl ketone, cyclopentanone, cyclohexanone, and cycloheptanone; ethers such as methyl ethyl ether, diethyl ether, dipropyl ether, diisopropyl ether, dibutyl ether, diisobutyl ether, di-n-amyl ether, diisoamyl ether, methyl propyl ether, methyl isopropyl ether, methyl butyl ether, ethyl propyl ether, ethyl isobutyl ether, ethyl-n-amyl ether, ethyl isoamyl ether, and tetrahydrofuran; and the like. Also, mixtures of about two to five kinds of the dispersion media described above may be used.

The porous carbon material is particularly a material having excellent compatibility and dispersibility with a water system and an alcohol system, and the dispersion medium is preferably a water-based solvent, an alcohol-based solvent, or a mixed solvent thereof in consideration of the cost and the kind of the carbon material.

In addition, a dispersing agent may be further added for smooth dispersion of the porous carbon material and the point contact binder.

The dispersing agent may be a nonionic, anionic, or cationic dispersing agent. The anionic dispersing agent may be, but is not limited to, sodium dodecyl sulfate (SDS), lithium dodecyl sulfate (LDS), sodium dodecyl sulfonate (SDSA), or sodium dodecyl benzene sulfonate (SDBS) which belong to the alkyl sulfate series. The nonionic dispersing agent may be, but is not limited to, glycerol monostearate, sorbitan monooleate, sorbitan trioleate (PEO (20)-Sorbitan Monooleate, Tween 80), polyvinyl alcohol (PVA), polymethylacrylate (PMA), methyl cellulose (MC), carboxyl methyl cellulose (CMC), gum arabic (GA), polysaccharide (Dextrin), polyethylenimine (PEI), polyvinylpyrrolidone (PVP) or polyethylene oxide (PEO), poly(ethylene oxide)-poly(butylene oxide) terpolymer. The cationic dispersing agent may be, but is not limited to, cetyltrimethyl ammonium chloride (CTAC), cetyltrimethyl ammonium bromide (CTAB), or dodecyl-trimethyl ammonium bromide (DTAB).

The step (c) is a step of introducing the sulfur-carbon composite prepared in the step (a) into the dispersion prepared in the step (b) and wet-mixing them to prepare a sulfur-carbon composite comprising a coating layer.

The present invention can produce a sulfur-carbon composite comprising a coating layer through a wet-mixing process of the dispersion, in which the porous carbon material and a point contact binder are dispersed, and the sulfur-carbon composite. As disclosed in Korean Patent Publication No. 2015-0135961, if a dry process is applied to form a coating layer on the surface of the sulfur-carbon composite, there is a problem that excessive use of the coating material is required for uniform formation of the coating layer. If the wet process according to the present invention is applied, it is possible to form a more uniform and effective coating layer as compared with the dry process and a relatively small amount of carbon material can be used to increase the discharging capacity and improve lifetime characteristic of the lithium-sulfur battery. As a result, there is an advantage that the positive electrode active material can be applied with high loading. In addition, since the coating layer is formed by the wet process through the dispersion medium, there is an advantage that the sulfur-carbon composite and the carbon material can bond strongly to form the stable positive electrode active material.

Also, the present invention may further include a drying step after step (c). The dispersion medium in which the porous carbon material and the point contact binder are dispersed is evaporated through the drying step, not only allowing the point contact binder to bind strongly to the porous carbon material, but also allowing the porous carbon material to bind strongly to the sulfur-carbon composite. The drying may be carried out in a convection oven in air at 70 to 90° C. for 4 to 24 hours. If the drying temperature is less than 70° C. or the drying period of time is shorter than 4 hours above, the dispersion medium may remain excessively and an uniform coating may not be obtained. If the drying temperature exceeds 90° C. or the drying period of time exceeds 24 hours, side reactions of the sulfur-carbon composites may occur through drying. Therefore, the drying temperature and drying period of time are appropriately adjusted within the above ranges.

In addition, the present invention relates to a positive electrode for a lithium-sulfur battery comprising a positive electrode current collector; and a positive electrode active material layer on the positive electrode current collector, wherein the positive electrode active material layer comprises the sulfur-carbon composite comprising the coating layer of the present invention described above, a conductive material, and a binder.

Since the sulfur-carbon composite comprising the coating layer of the present invention is a positive electrode active material and the coating layer comprises a point contact binder, the adhesive force of the positive electrode active material layer to the positive electrode current collector can be increased. Therefore, it is possible to prevent the detachment phenomenon of the positive electrode active material layer, thereby making it easy to manufacture the positive electrode and further improving the lifetime characteristic of the lithium-sulfur battery.

It is also possible to increase the adhesive force between the positive electrode current collector and the positive electrode active material layer even in a positive electrode having a low porosity.

In the present invention, the low porosity means that the porosity is 68% or less.

The positive electrode current collector generally has a thickness of 3 to 500 μm and is not particularly limited as long as it has high conductivity without causing chemical changes in the battery. Specifically, a conductive material such as stainless steel, aluminum, copper, or titanium, etc., can be used as the positive electrode current collector. Also, the positive electrode current collector may be formed in various forms such as film, sheet, foil, net, porous body, foam, or nonwoven fabric.

The conductive material is not particularly limited as long as it has electrical conductivity without causing chemical changes in the battery, and carbon black-based materials such as Super-P, Denka black, acetylene black, Ketjen black, channel black, furnace black, lamp black, thermal black, and carbon black; carbon derivatives such as carbon nanotube or fullerene; conductive fibers such as carbon fiber or metal fiber; carbon fluoride; metal powders such as aluminum powder and nickel powder; and conductive polymers such as polyaniline, polythiophene, polyacetylene, and polypyrrole may be used alone or in combination.

The content of the conductive material may be 0.01 to 30% by weight based on the total weight of the positive electrode active material layer.

The binder is a component that maintains a positive electrode active material on a positive electrode current collector and has the function of organically connecting between positive electrode active materials. An area contact binder may be used for the positive electrode active material layer. The area contact binder can be, for example, polyvinylidene fluoride, polyvinylidene fluoride-hexafluoropropylene, polyvinyl alcohol, starch, hydroxypropyl cellulose, regenerated cellulose, polyethylene, polypropylene, ethylene propylene diene rubber (EPDM), sulfonated-EPDM, fluorine rubber, polyacrylic acid, various copolymers thereof and the like.

The binder contained in the positive electrode active material layer of the present invention does not comprise a point contact binder. If the point contact binder is comprised, the adhesive force of the electrode can be increased, but the reactivity and lifetime characteristics of the battery may be lowered, which is not preferable.

The content of the binder may be 0.5 to 30% by weight based on the total weight of the positive electrode active material layer. If the content of the binder is less than 0.5% by weight, the physical properties of the positive electrode may be deteriorated and the active material and the conductive material in the positive electrode may be detached. If the content of the binder exceeds 30% by weight, the ratio of the active material and the conductive material in the positive electrode may be relatively decreased, thereby reducing the capacity of the battery.

In the past, heterogeneous binders were used to improve the adhesive force between the positive electrode current collector and the positive electrode active material layer. However, if heterogeneous binders are used, there was a problem that the performance of the lithium-sulfur battery is deteriorated due to the occurrence of the agglomeration phenomenon of the binders.

In the present invention, a point contact binder is contained in the coating layer of the sulfur-carbon composite, and an area contact binder is contained in the positive electrode active material layer, which is different from the point contact binder. Therefore, although the heterogeneous binders are contained, the point contact binder is located in the coating layer of the sulfur-carbon composite, so that the above-mentioned aggregation phenomenon can be solved.

The positive electrode active material layer is formed by forming a positive electrode active material in the form of a slurry, wherein a binder is dissolved in a solvent for preparing a slurry, and then a conductive material is dispersed thereto. The solvent for preparing the slurry is preferably one which can uniformly disperse the positive electrode active material, the binder, and the conductive material, and is easily evaporated. The solvent for preparing the slurry may typically be acetonitrile, methanol, ethanol, tetrahydrofuran, water, isopropyl alcohol, and the like. Next, a slurry for the positive electrode is prepared by uniformly dispersing the sulfur-carbon composite comprising the coating layer, or the conductive material, optionally along with the additives, to a solvent. The amounts of the solvent contained in the slurry, the sulfur-carbon composite including the coating layer, or optionally the additives are not particularly important in the present application, and are sufficient only if the slurry has an appropriate viscosity to facilitate coating of the slurry.

Thereafter, the positive electrode current collector can be coated with the slurry and then dried to produce a positive electrode for a lithium-sulfur battery. The slurry may be coated on the current collector in a suitable thickness depending on the viscosity of the slurry and the thickness of the positive electrode to be formed.

The drying may be carried out at a temperature of about 80° C. The drying temperature is the glass transition temperature of the point contact binder, and the point contact binder is liberated at this temperature to allow an adhesion between the sulfur-carbon composites comprising the coating layer, and a point-like adhesion between the positive electrode active material layer, which comprises the sulfur-carbon composite comprising the coating layer, and the positive electrode current collector. Therefore, it is possible to improve the adhesive force to the positive electrode current the collector without deteriorating lifetime characteristic of the lithium-sulfur battery.

In addition, the positive electrode for the lithium-sulfur battery manufactured after drying the slurry can be further subjected to a rolling step to control the porosity of the positive electrode.

In addition, the present invention relates to lithium-sulfur battery comprising a positive electrode; a negative electrode; a separator interposed between the positive electrode and the negative electrode; and an electrolyte solution, wherein the positive electrode is the positive electrode of the present invention described above.

The negative electrode may be composed of a current collector and a negative electrode active material layer formed on one or both sides thereof. Also, the negative electrode may be a lithium metal plate.

The current collector is for supporting the negative electrode active material and is not particularly limited as long as it is electrochemically stable in the voltage range of the lithium secondary battery while having excellent conductivity. For example, copper, stainless steel, aluminum, nickel, titanium, palladium, sintered carbon; copper or stainless steel surface-treated with carbon, nickel, silver or the like; aluminum-cadmium alloy or the like may be used as the current collector.

The negative electrode current collector can enhance the bonding force with the negative electrode active material by having fine irregularities formed on its surface, and may be formed in various forms such as film, sheet, foil, mesh, net, porous body, foam, or nonwoven fabric.

The negative electrode active material may comprise a material capable of reversibly intercalating or deintercalating lithium ion, a material capable of reacting with lithium ion to reversibly form lithium containing compounds, or lithium metal or lithium alloy.

The material capable of reversibly intercalating or deintercalating lithium ion can be, for example, crystalline carbon, amorphous carbon, or a mixture thereof.

The material capable of reacting with lithium ion to reversibly form lithium containing compounds may be, for example, tin oxide, titanium nitrate, or silicon.

The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

A separator may be further included between the positive electrode and negative electrode described above. The separator separates or insulates the positive electrode and the negative electrode from each other and allows the lithium ion to be transported between the positive electrode and the negative electrode. The separator may be made of a porous nonconductive or insulating material. Such separator may be an independent member such as a film or a coating layer added to the positive electrode and/or the negative electrode.

Materials for forming the separator include, but are not limited to, polyolefins such as polyethylene and polypropylene, glass fiber filters, and ceramic materials, and the thickness of the separator may be from about 5 to about 50 μm, preferably from about 5 to about 25 μm.

The electrolyte solution is a non-aqueous electrolyte containing a lithium salt and is composed of a lithium salt and an electrolyte solution. The electrolyte solution is a non-aqueous organic solvent, an organic solid electrolyte, and an inorganic solid electrolyte.

The lithium salt may be used without limitation as long as it is commonly used in an electrolyte solution for a lithium-sulfur battery. For example, the lithium salt may comprise at least one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, lithium chloroborane, lithium lower aliphatic carboxylate and the like.

In addition, the concentration of the lithium salt in the electrolyte solution may be 0.2 to 2 M, specifically 0.6 to 2 M, more specifically 0.7 to 1.7 M. If the concentration of the lithium salt is less than 0.2 M, the conductivity of the electrolyte solution may be lowered and the performance of the electrolyte solution may be deteriorated. If the concentration exceeds 2 M, the viscosity of the electrolyte solution may be increased to be lower the mobility of the lithium ion.

The non-aqueous organic solvent should dissolve the lithium salt well, and the non-aqueous organic solvent of the present invention may include, for example, aprotic organic solvents such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents may be used alone or may be a mixture of two or more organic solvents.

As the organic electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers including ionic dissociation groups and the like can be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N, N-substituted imidazolidine, ethylene glycol dialkyl ether, ammonium salt, pyrrole, 2-methoxy ethanol, or aluminum trichloride, etc. may also be added for the purpose of improving charge/discharge characteristics, flame retardancy, and the like. In some cases, a halogen-containing solvent such as carbon tetrachloride, ethylene trifluoride or the like can be also added for the purpose of imparting nonflammability, and a carbon dioxide gas can be further comprised for the purpose of improving preservation characteristics at a high temperature, and fluoro-ethylene carbonate (FEC), propene sultone (PRS), fluoro-propylene carbonate (FPC) and the like can be further comprised.

The electrolyte may be a liquid electrolyte and also may be an electrolyte separator form in a solid state. When using the liquid electrolyte, a separator made of porous glass, plastic, ceramic, or polymer is further comprised as a physical separator having a function of physically separating the electrodes.

The shape of the lithium-sulfur battery as described above is not particularly limited and may be, for example, a jelly-roll type, a stack type, a stack-folding type (including a stack-Z-folding type), or a lamination-stacking type, and preferably a stack-folding type.

An electrode assembly in which the positive electrode as described above, the separator, and the negative electrode are successively laminated is manufactured and then placed it in a battery case. Thereafter, a lithium-sulfur battery is manufactured by injecting an electrolyte solution into the upper part of the case and sealing it with a cap plate and a gasket.

The lithium-sulfur battery may be classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

Hereinafter, preferred examples present of the invention will be described in order to facilitate understanding of the present invention. It will be apparent to those skilled in the art, however, that the following examples are illustrative of the present invention and that various changes and modifications can be made within the scope and spirit of the present invention. It will be apparent that such variations and modifications are intended to be within the scope of the appended claims.

<Preparation of Positive Electrode for Lithium-Sulfur Battery>

Example 1

0.5 g of carbon nanotubes and 1.5 g of sulfur were uniformly mixed and then heat-treated at 155° C. for 30 minutes to prepare a sulfur-carbon composite.

40 mg of carbon nanotubes and 10 mg of polyvinylidene fluoride (PVDF) were dispersed in ethanol as a dispersion medium to prepare a dispersion.

The sulfur-carbon composite was stirred in the dispersion for 1 hour and then dried overnight at a temperature of 50° C. to produce a sulfur-carbon composite comprising a coating layer.

The coating layer contained carbon nanotubes as a porous carbon material and contained PVDF as a point contact binder, and the point contact binder was contained in an amount of 0.5% by weight based on the total weight of the sulfur-carbon composite.

The sulfur-carbon composite comprising the coating layer (positive electrode active material), the conductive material, and the binder were mixed at a weight ratio of 90:5:5 of sulfur-carbon composite: the conductive material: the binder to prepare a slurry for forming a positive electrode active material layer, and then coated it on the current collector of aluminum foil with a thickness of 20 μm and dried at a temperature of 80° C. to produce a positive electrode for a lithium-sulfur battery.

At this time, carbon black was used as an conductive material, and polyvinylidene fluoride-hexafluoropropylene (PVDF-HFP), which is an area contact binder, was used as a binder.

Example 2

A positive electrode for a lithium-sulfur battery was prepared in the same manner as in Example 1, except that the point contact binder is contained in an amount of 1.5% by weight based on the total weight of the sulfur-carbon composite.

The sulfur-carbon composites including the coating layer were observed by SEM. As a result, it was confirmed that contact between the composites was formed by the point contact binder in the coating layer (FIG. 2).

In addition, the sulfur-carbon composites comprising the coating layer were observed using EDS. As a result, it was confirmed that the point contact binder was contained in the coating layer (FIG. 3).

The surface of the positive electrode was observed using SEM. As a result, it was confirmed that good adhesion between the positive electrode active material and the positive electrode current collector was achieved and contact between the composites was also formed (FIG. 4).

If the adhesive force of the positive electrode active material is low, the positive electrode active material is easily detached from the current collector to make the surface of the positive electrode look smooth and clean, but if the adhesive force is high, the positive electrode active material is present in the current collector and thus its surface is observed to be uneven.

Accordingly, when visually observing the surface of the positive electrode of Example 2, since the surface of the positive electrode is observed to be uneven, it can be seen that the sulfur-carbon composite comprising the coating layer containing the point contact binder, which is a positive electrode active material of the present invention, has excellent adhesive force (FIG. 5).

Example 3

A positive electrode for a lithium-sulfur battery was prepared in the same manner as in Example 1, except that the point contact binder is contained in an amount of 3% by weight based on the total weight of the sulfur-carbon composite.

Comparative Example 1

A positive electrode for a lithium-sulfur battery was prepared in the same manner as in Example 1, except that the point contact binder is not used.

When visually observing the surface of the positive electrode, the surface looked smooth (FIG. 6). Accordingly, it was confirmed that if the point contact binder is not contained in the coating layer, the adhesive force is very low.

Experimental Example 1: Measurement of Adhesive Force of Positive Electrode for Lithium-Sulfur Battery The positive electrodes for the lithium-sulfur battery prepared in Example 2, Example 3, and Comparative Example 1 were prepared as positive electrodes for a lithium-sulfur battery having porosities of 65% and 75%.

The adhesive forces of the positive electrode for the lithium-sulfur battery of Example 2, Example 3, and Comparative Example 1 having the porosities of 65% and 75% were measured. The adhesive force of the positive electrode active material layer was measured by calculating the force when the positive electrode active material layer is dropped by pulling the electrode in a direction of 90 degrees using a Peel test equipment.

The adhesive force refers to the adhesive force of the positive electrode active material layer to the positive electrode current collector.

The results are shown in Table 1, FIG. 7, and FIG. 8.

TABLE 1

(unit: gf/cm)

|  | Example 2 | Example 3 | Comparative Example 1 |
|---|---|---|---|
| 65% | 1.5 | 5.5 | 1.2 |
| 75% | 0.92 | not measurable | 0.75 |

In the case of Example 3 in which the point contact binder is contained in an amount of 3% by weight based on the total weight of the sulfur-carbon composite, since the porosity of the positive electrode was less than 75%, it was impossible to measure the positive electrode with porosity of 75%.

In Table 1, it was confirmed that Examples 2 and 3 of the present invention comprising the point contact binder are superior in terms of adhesive ability to the positive electrode current collector as compared to Comparative Example 1 which does not comprise the point contact binder and that the result of the adhesive force of Example 3 having the high content of the point contact binder is superior to that of Example 2.

Through the above results, it was confirmed that the sulfur-carbon composite comprising the coating layer of the present invention comprising the point contact binder in the coating layer can increase the adhesive force between the positive electrode current collector and the positive electrode active material layer, and that the adhesive force increases as the content of the point contact binder increases.

Experimental Example 2: Evaluation of Charging/Discharging Characteristic of Lithium-Sulfur Battery The positive electrodes of Example 1 and Comparative Example 1 were used. A lithium-sulfur battery coin cell was manufactured using polyethylene as a separator and a lithium foil with a thickness of 150 μm as a negative electrode. At this time, the coin cell was manufactured using the electrolyte solution prepared by dissolving 1 M LiFSI and 1% $LiNO_3$ in the organic solvent of diethylene glycol dimethyl ether.

The manufactured coin cell was measured for capacity from 1.8 to 2.5 V using a charging-discharging measuring device (LAND CT-2001A, Wuhan, China). Specifically, the initial charging/discharging was performed at 0.1 C/0.1 C and then the charging/discharging cycles at 0.3 C/0.5 C were repeated 100 times to measure the discharging capacity.

As a result, it was confirmed that the coin cell of Example 1 comprising the sulfur-carbon composite comprising the coating layer of the present invention maintains the constant discharging capacity even when the cycles are proceeded, but the discharging capacity of the coin cell of Comparative Example 1 gradually decreases when the cycles are proceeded (FIG. 9).

In the case of Comparative Example 1, since the coating layer of the sulfur-carbon composite did not contain the contact binder, adhesion between the positive point electrode active material and the positive electrode current collector was not achieved properly. Therefore, the stability of the lithium-sulfur battery was poor and the lifetime characteristic was not excellent.

Accordingly, it was confirmed that the sulfur-carbon composite comprising the coating layer of the present invention comprising the point contact binder in the coating layer is excellent in the lifetime characteristic of the lithium-sulfur battery.

The invention claimed is:

1. A composite comprising:
   a sulfur-carbon composite, which comprises a first porous carbon material and sulfur contained in at least a part of an inside and a surface of the first porous carbon material; and
   a coating layer on the surface of the sulfur-carbon composite, which coating layer comprises a second porous carbon material and a point contact binder,
   wherein the point contact binder comprises at least one selected from the group consisting of polytetrafluoroethylene, styrene butadiene rubber, carboxymethyl cellulose, polyvinylidene fluoride, and polyvinylidene fluoride-hexafluoropropylene,
   wherein the second porous carbon material is present in an amount of 40% by weight to 80% by weight based on a total weight of the coating layer,
   wherein the point contact binder is present in an amount of 0.5% by weight to 3% by weight based on a total weight of the sulfur-carbon composite,
   wherein the coating layer has a thickness of 50 nm to 100 nm, and
   wherein the sulfur-carbon composite inside the coating layer has a diameter of 10 μm to 50 μm.

2. The composite of claim 1, wherein the point contact binder is present in an amount of 0.5% by weight to 1.5% by weight based on a total weight of the sulfur-carbon composite.

3. The composite of claim 1, wherein the second porous carbon material is present in an amount of 40% by weight to 60% by weight.

4. The composite of claim 1, wherein the point contact binder comprises polytetrafluoroethylene.

5. The composite of claim 1, wherein the point contact binder comprises styrene butadiene rubber.

6. The composite of claim 1, wherein the point contact binder comprises carboxymethyl cellulose.

7. The composite of claim 1, wherein the point contact binder comprises polyvinylidene fluoride.

8. The composite of claim 1, wherein the point contact binder comprises polyvinylidene fluoride-hexafluoropropylene.

9. A method for preparing a sulfur-carbon composite according to claim 1, comprising a coating layer comprising the steps of:
   (a) preparing a sulfur-carbon composite by mixing a first porous carbon material and sulfur;
   (b) dispersing a second porous carbon material and a point contact binder in a dispersion medium to prepare a dispersion; and
   (c) injecting and wet-mixing the sulfur-carbon composite into the dispersion and then forming a coating layer comprising the second porous carbon material and the point contact binder on a surface of the sulfur-carbon composite to form the composite.

10. The method for preparing a composite of claim 9, wherein the dispersion medium comprises at least one selected from the group consisting of water, an alcohol-based compound, a ketone-based compound, and an ether-based compound.

11. A positive electrode for a lithium-sulfur battery comprising a positive electrode current collector; and a positive electrode active material layer on the positive electrode current collector, wherein the positive electrode active material layer comprises the composite of claim 1, a conductive material, and a binder.

12. The positive electrode for the lithium-sulfur battery of claim 11, wherein the binder is an area contact binder.

13. A lithium-sulfur battery comprising a positive electrode; a negative electrode; a separator interposed between the positive electrode and the negative electrode; and an electrolyte solution, wherein the positive electrode is the positive electrode of claim 11.

* * * * *